H. ROUSSILHE.
APPARATUS FOR CORRECTING AND REPRODUCING AERIAL PHOTOGRAPHS.
APPLICATION FILED NOV. 28, 1919.
1,410,127.
Patented Mar. 21, 1922.
4 SHEETS—SHEET 1.
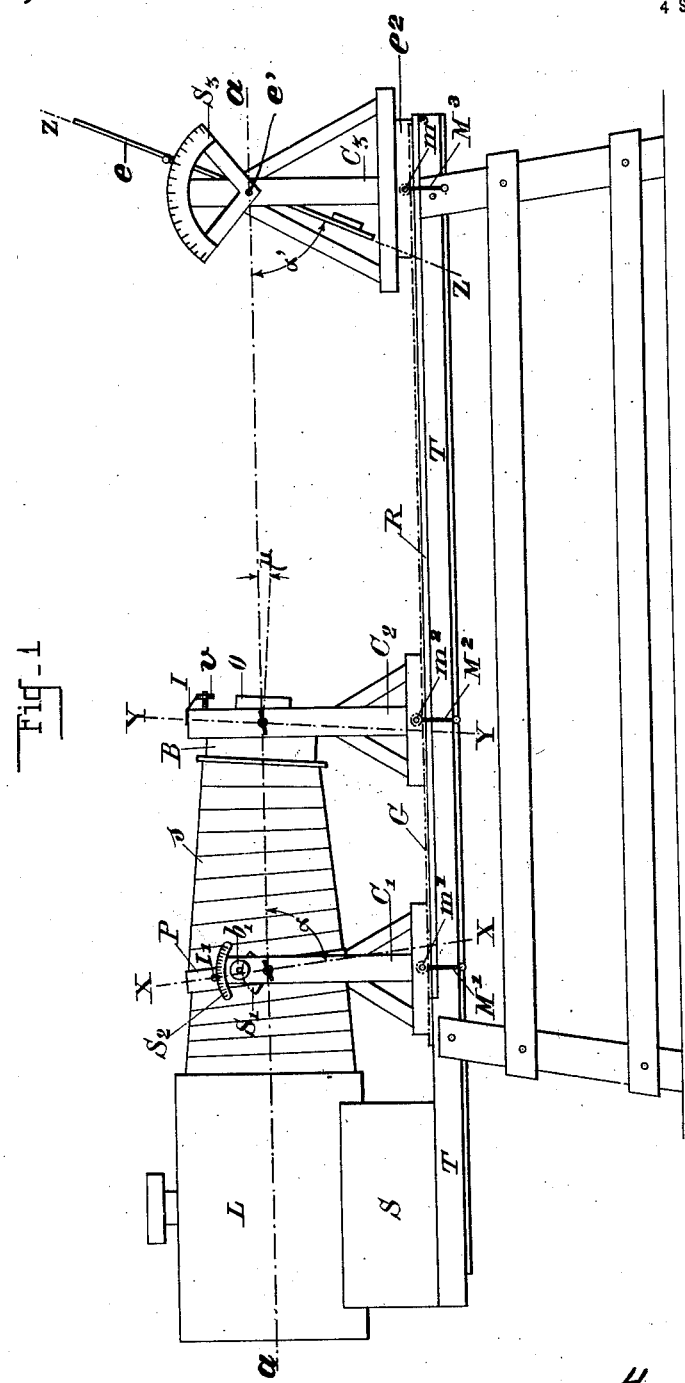
Inventor:
Henri Roussilhe
By Lawrence Langner
Attorney

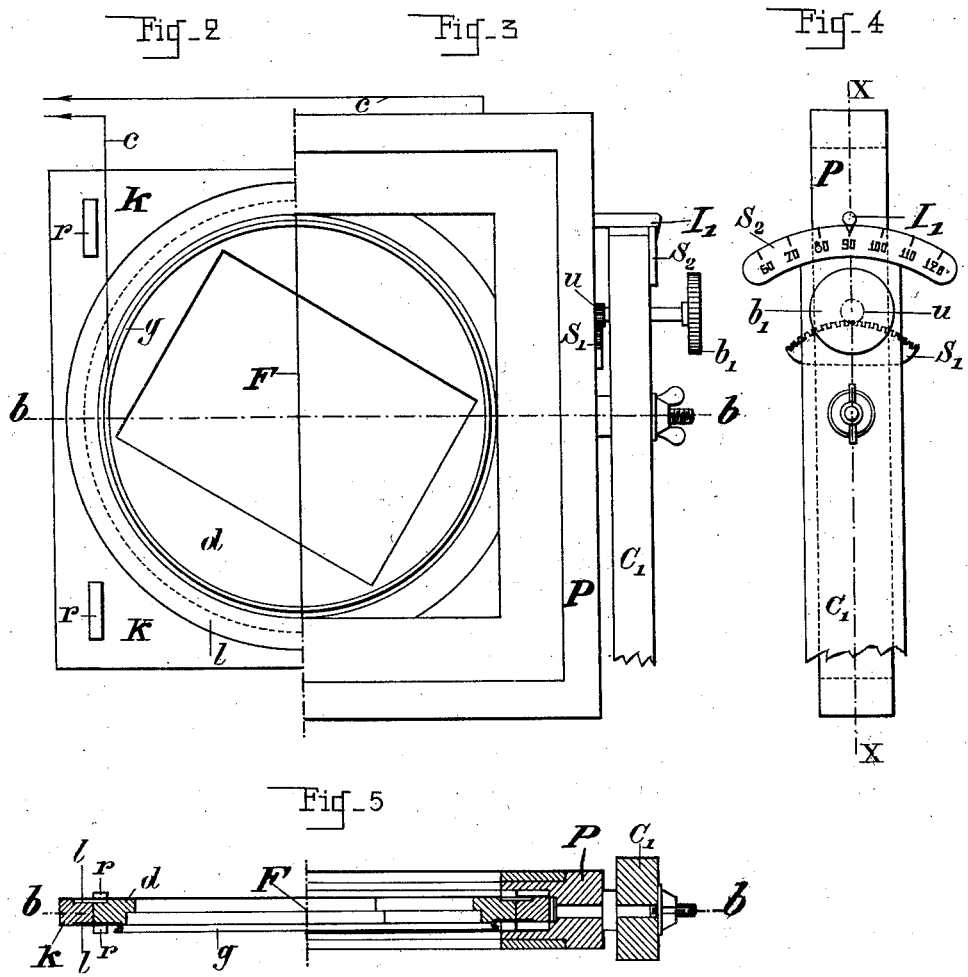

H. ROUSSILHE.
APPARATUS FOR CORRECTING AND REPRODUCING AERIAL PHOTOGRAPHS.
APPLICATION FILED NOV. 28, 1919.

1,410,127.  Patented Mar. 21, 1922.

Inventor:
Henry Roussilhe
By Lawrence Langner
Attorney.

H. ROUSSILHE.
APPARATUS FOR CORRECTING AND REPRODUCING AERIAL PHOTOGRAPHS.
APPLICATION FILED NOV. 28, 1919.

Inventor
Henri Roussilhe
By Lawrence Langner
Attorney

UNITED STATES PATENT OFFICE.

HENRI ROUSSILHE, OF SOISY SOUS ETIOLES, FRANCE.

APPARATUS FOR CORRECTING AND REPRODUCING AERIAL PHOTOGRAPHS.

1,410,127. Specification of Letters Patent. Patented Mar. 21, 1922.

Application filed November 28, 1919. Serial No. 341,265.

(GRANTED UNDER THE PROVISIONS OF THE ACT OF MARCH 3, 1921, 41 STAT. L., 1313.)

*To all whom it may concern:*

Be it known that HENRI ROUSSILHE, citizen of the Republic of France, residing at Soisy sous Etioles, Seine et Oise, France, has invented a new and useful apparatus for correcting and reproducing aerial photographs, (for which I have filed an application in France November 21, 1918, No. 496,384,) of which the following is a specification.

Aerial photographs taken from a flying machine always give distorted views, owing to the fact that such photographs are taken at a certain angle. From this it results that one cannot without laborious transformation obtain an exact reproduction of the area photographed, and especially in view of the fact that the area photographed is not usually level. The apparatus which forms the object of the present invention is devised to effect with facility this reproduction and photographic reconstruction and thus to transform into exact maps photographs taken from a flying machine, a result which, in addition to its military application, presents considerable advantages especially in the operation of revising the map.

One embodiment of the invention is illustrated, by way of example, in the accompanying drawings, in which—

Figure 1 is an elevation of the complete apparatus;

Figures 2 and 3 show, respectively, on an enlarged scale, half of the picture support, and half of the carrier and the turning frame, with the side bellows removed, said bellows tightly connecting together the frame which carries the pictures, the box forming the front of the chamber of the camera and the body of the lantern.

Figure 4 is a right-hand end view of Fig. 3 showing the arrangement for turning the frame and measuring the angles.

Figure 5 is a horizontal section on line $b$—$b$ of Figs. 2 and 3.

The same letters of reference indicate the same parts throughout the various figures.

Figure 6:
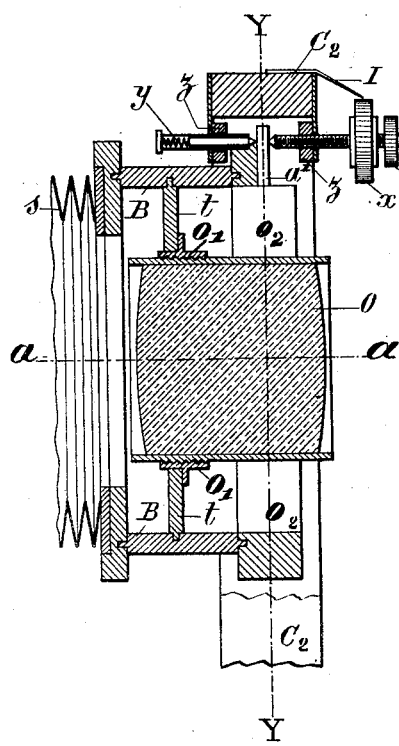
Figure 6 is a partial sectional view of the support for the objective taken in a vertical plane which contains the axis of projection.

Theory proves that when the geometrical and optical conditions of the reconstruction are fulfilled the distances and the angles defining the positions of the block and of its reproduction must satisfy the following equations:

$$p = \frac{K + \cos i}{2K} \quad p' = \frac{K + \cos i}{2 \cos i}$$

$$\cos \alpha = \frac{2K + \cos i}{2K(K + \cos i)} \sin i$$

$$\cos \alpha = \frac{1 + 2K^2 - \sin^2 i + 2K \cos i}{2K(K + \cos i)} \sin i$$

The demonstration of these formulæ is given in lines 1, 2, 4 and 5 of page 56 of the work by applicant, filed with the amendment of June 11, 1920, and entitled "Applications of aerial photography to topographical maps."

In these formulæ—

$f$ indicates the focal distances of the photographic objective employed at the same time in the apparatus of the flying machine and in the apparatus for reconstruction.

In practice, in the objectives employed for taking 18/24 plates from a flying machine at an altitude varying between 1,500 and 2,500 metres, this focal distance equals 50 centimeters.

A indicates the altitude of the flying machine apparatus at the moment of taking the aerial photograph.

E indicates the scale of reconstruction. With 18/24 plates taken at an altitude A comprised between 1,500 and 2,500 meters, the scale of reconstruction which is adopted in practice is equal to the inverse of the mean altitude, that is to say, in consequence, $$E = \frac{1}{2,000}.$$

$i$ indicates the inclination of the plane of the aerial representation with relation to the horizontal plane.

$\alpha, \alpha'$ indicate the inclination with regard to the horizontal view of the picture and of the reconstruction in the special apparatus.

$p$, $p^x$ indicate the distances from the optic centre to the centre of the plate and to its image in the reconstruction.

The position of the objective the optic centre of which is determined by the distances $p$, $p^x$ is completely defined by the angle of decentration $\mu$ relative to the principal optic axis and to the centre of the block forming the angle of decentration which is determined by the formula—

$$tg. \mu = \frac{\sin i \cos i}{2K(K+\cos i) \sin \alpha}$$

Work cited, page 56, line 6.

In these various formulæ $K = \frac{AE}{f}$

Referring first to Fig. 1 of the drawings, which shows the realization of the geometric conditions above set forth,—

$a$—$a$ indicates the principal axis of the apparatus.

X—X the plane of the picture.

Y—Y the principal plane of the objective.

Z—Z the plane of the projection frame.

The apparatus comprises a table T provided with a track for travelling devices and supported by a removable frame.

L indicates the projecting lantern (preferably an arc lamp of 15 amperes 110 volts carried on a socket S with axis of projection placed at least 50 centimeters above the plane of the table).

The picture, the objective O and the frame $e$ are supported by three sliding pieces $C_1$, $C_2$, $C_3$, travelling upon the rails of the table and operated by three handles $M^1$, $M^2$, $M^3$, turning the pinions $m^1$, $m^2$, $m^3$ which engage with the racks G fixed upon the table T.

In the correct position described as the reconstruction position, the plane X—X of the picture and the plane Z—Z of the frame must be perpendicular to the plane of Fig. 1. The frame P bearing the picture, the box B forming the front of the photographic apparatus chamber, and the lantern body L are connected together by light-tight folding bellows $s$. The angles $\alpha$ are measured upon a graduated sector $S_2$ integral with the vertical support of the carrier $C_1$ (Figs. 1, 3 and 4).

Figure 7:
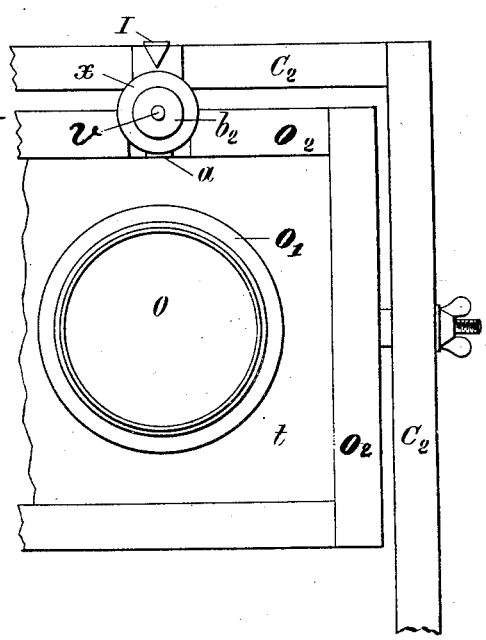
Figure 7 is a front view of Fig. 6.

The decentration angles $\mu$ are measured by aid of the graduated drum $x$ on the screw $v$ and of the pointer I (Figs. 1, 6 and 7).

The angles $\alpha^x$ are measured upon a graduated sector $S_3$ rigidly connected to the vertical support of the carrier $C_3$ (Fig. 1).

The distances $p$, $p^x$, are measured upon a divided scale R integral with the table T.

In order to obtain the horizontal data of the picture, the said picture is mounted to turn in its plane. For this purpose the picture carrier is constructed, as is shown in Figs. 2 and 3, by means of a disc $d$ provided with an aperture 18/24 exactly centered. The rotation of the disc in the plane of the picture may be effected by means of different arrangements, for example it may be moved by means of a pulley $g$ and the cords $c$.

The disc and the external support in which it turns form a movable frame which may be encased in a grooved frame $k$, itself arranged to rotate upon a horizontal axis $b$—$b$ passing through the center of the said plate. The to-and-fro motions of the frame are effected by means of a rack and pinion as already explained. With regard to this turning motion upon the horizontal axis $b$—$b$, it is attained as shown in Figs. 3 and 4 by means of a toothed sector $S_1$ fixed upon the upright P and the pinion $u$ actuated by the stud $b'$. The letter $I_1$ indicates an index integral with the upright P; $l$ is the brass crown forming decorations, $r$ the damping springs in the frame and F a wire stretched in the vertical plane from the center of the plate.

*The decentering of the objective.*

The fixed axis of the projecting apparatus being defined by the center of the plate and the optical center of the objective, it is impossible to give to the picture the decentration desired by moving it in its plane. This decentering is realized by means of a mechanism which causes the principal axis of the objective to swing about the horizontal plane passing through the middle of the nodal points.

These displacements may be obtained in different ways and in particular by means of the arrangement illustrated in Figs. 6 and 7, in which—

Y—Y indicates as in Fig. 1 the plane perpendicular to the optical axis of the objective passing through the middle of the nodal points.

$C_2$ indicates the supports of the carrier of the objective.

$O_2$ indicates the supports of the frame fixed to the horizontal axis of rotation.

B indicates the box supporting the objective O and connected to the picture bearing frame by the bellows;

$t$ the plate supporting the objective;

$O_1$ the washer supporting the objective;

$a'$ a piece of brass forming the straight edge;

$v$ the screw;

$b_2$ the adjusting stud;

I an index fixed to the sliding piece;

$y$ a plunger with a spring acting upon the said straight edge; and $z$ the nuts of the screw and of the plunger.

The manner of using the previously-described apparatus is as follows:—

To effect the correction, by photography, of a plate taken from an air-ship in an unknown position and without being able to utilize either the parallelism of the vertical lines or the line of the horizon, which are equally unknown, the direction of the horizontals of the plate is first sought, and to that end the operation is as follows:—

There are chosen upon the plate at least three-guide points, the geographical co-ordinates and the altitudes of which are determined by operations made upon the ground. The center of the plate is marked by a sharp point and then the three guide points are indicated on a tracing checkered to the scale of reconstruction E, which scale has previously been defined.

In order that the correction of the plate may preserve all the sharpness of the images, the enlargement of the plate must remain less than 2.5. On the other hand, in order that the image of the plate may be in focus on a plane, this same plate must nevertheless be sufficiently enlarged and it is this second condition which determines the minimum enlargement at 1.5. It is necessary, moreover, to cut down by one-half the objective of reconstruction which is, of course, always assumed to be identical with the photographic objective of the air-ship (that is to say, having a focal distance $f$ 50 centimeters for 18/24 plates).

In order to effect the coincidence of the guide marks and their images, action is taken at the same time:—

$a$. With respect to the adjustment to focus of the distance $p$ between the optical center of the objective and the center of the plate in the reconstruction, which adjustment is effected by turning the handle $M^2$ of the carriage $C_2$ of the objective O and the handle $M^3$ of the carriage $C_3$ of the screen $e$.

$b$. With respect to the inclination $\alpha$ of the plane X—X of the plate relative to the horizontal, by rotating the operating button $b_1$, which causes the plate-holder P to turn about the horizontal axis $b$—$b$ situated in the plane of the plate and passing through its center.

$c$. With respect to the rotary movements of the screen $e$ about the axis $e'$ situated in the plane of the screen, and about the vertical axis passing through its center. The latter movement is effected by hand, and the carriage $C_3$, which carries the screen, to this end turns on a circular wooden disc in the same way as the alidade of a theodolite in the interior of its circle.

This first operation permits one to determine at a glance the direction of the line of intersection of the planes X—X and Z—Z corresponding, respectively, to the plate and the screen.

The checkered tracing carrying the three above-mentioned guide marks is then moved upon the screen and the plate is rotated in its plane in a way to preserve the coincidence of the marked guide points and their projected images but in such manner that the line D and the horizontal axis of rotation of the screen are made parallel to the horizontal axis of rotation of the plate. When this result is attained, the plane X—X of the plate, the plane Y—Y perpendicular to the axis $a$—$a$ of the objective and the plane Z—Z of the screen are all three perpendicular to the vertical plane passing through the optical axis of the apparatus.

In this way the direction of the horizontals of the plate has been determined.

But, when the points on the earth corresponding to the points chosen as guide points are not at the same altitude and, above all, when more than three guide points are employed, exact coincidence of the guide points is not obtained and the correction effected as has been described is still only a first approximation.

It is used in the following manner:—

The length $p'$ is read upon the graduated ruler R, the angle $\alpha$ upon the sector $S_2$ and the angle $\alpha'$ upon the sector $S_3$.

The value of the angle $i$ is deduced (approximate value) from the formula:—

$$\cos i = \frac{\sin \alpha'}{\sin \alpha}$$

Work cited, page 28, line 9, and page 34, line 25.

An abacus constructed according to this formula gives at once the value of $i$ when $\alpha$ and $\alpha'$ are known.

Likewise the elements which determine the position of the photographic station are deduced therefrom (also approximate position), this position being defined by the line of greatest inclination of the screen (photographic image of the wire stretched along the line of greatest inclination of the plate and in its plane), by the altitude A of the station, and by the location of the foot of the vertical of this station upon the horizontal plane taken as a base.

The altitude A is given by the formula:—

$$A = \frac{p^0}{E} \cdot \frac{p' - \varphi}{\varphi} \cos i$$

in which formula $p^0$ designates the distance from the plate to the optical center of the air-ship apparatus and $\varphi$ the focal length of the objective of reconstruction.

Or, as has been said above, in practice the following values are taken:—

$$\varphi = f = 50 \text{ cm} = \tfrac{1}{2}m$$

and $$E = \frac{1}{2000}$$

On the other hand, when plates are taken at an altitude greater than 1,000 meters, $p^0$ can be replaced by $f$ for the difference $p^0 - f$ is less than ¼ of a millimeter.

It follows that $$A = \frac{f}{E} \cdot \frac{p'-f}{f} \cos i$$

So that $A = 1000 \ (2 \ p' - 1) \cos i$.

An abacus constructed according to this formula gives at once the value of A when $i$ is known.

The location of the foot of the vertical of the photographic station is given by the formula:—

$$\Omega \ V = A \cdot tg. \ i = 1{,}000 \ (2 \ p' - 1) \sin i.$$

In this formula $\Omega$ designates the point of the earth of which the image is at the center $\omega$ of plate and V designates the foot of the vertical of the station.

An abacus constructed according to this formula gives at once the value $\Omega \ V$ where $i$ is known.

The projection should be effected by giving to the objective the desired angular decentration defined by the angle $\mu$ which is given by the formula:—

$$tg. \ \mu = \frac{\sin i \cos i}{2K \ (K + \cos i) \sin \alpha}$$

An abacus constructed according to this formula gives at once the value $\mu$ where $i$ and K are known (the angle $\alpha$ can be expressed in terms of $i$ and K also as has been explained at the beginning of the description).

Figure 8:
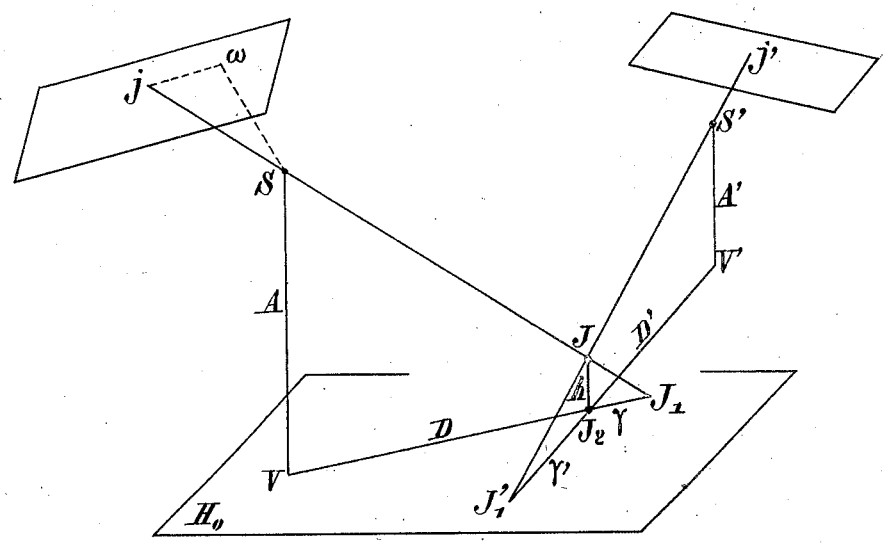
Figure 8 is a diagram indicating how the corrections for relief are determined.

When the approximate location of the station has been determined as has been explained, the guide points are replaced by their conical perspectives. The displacements to be made to the guide points are the inverse of the corrections of the relief, which are defined in the following manner (see Figure 8):—

Let $j$ be a point of the plate and $J_1$ its conical perspective upon the horizontal plane of altitude $H_0$. If the point J of the earth is at the altitude $H_0 + h$, the reconstruction of the point $j$ will not be in $J_1$ but in $J_2$. The vector of correction passes then through the foot V of the vertical of the station and it is directed towards V if $h$ is positive. The figure shows that the distance $J—J_2$ is equal to $$\gamma = h \cdot \frac{D}{A}$$

in which A designates the altitude of the station S and D the distance $V \ J_1$.

An abacus constructed according to this formula gives at once $\gamma$ where $h$ and the relation D/A are known.

If the relief is unknown, many crossed views are employed; the point $J_2$ is then determined by the intersection of the vectors $J_1 \ V$, $J_1' \ V'$, etc., and the height of the point J is determined by means of the values.

$$h = \frac{A}{D} \gamma = \frac{A'}{D'} \gamma', \text{ etc.}$$

The general methods employed in topography are then strictly followed, that is to say:—

1st. The position and the height of each station are determined by three points at least.

2nd. For the planimetry the azimuthal sight lines obtained by intersection are utilized.

3rd. The heights beginning with the height of each station and the distances to the sight points are determined.

In order to obtain now the reconstruction of the plate the operation is as follows:

$a$. The decentering screw $v$ is turned in such manner that the drum $x$ indicates the value $\mu$ on the face of the index I.

$b$. The distances $p$ and $p'$ are adjusted slightly as well as the angles $\alpha$ and $\alpha'$ so as to cause the exact coincidence with the conical perspectives of the guide points.

$c$. The ultimate values of $p$ and $p'$ are then read upon the scale R and the ultimate values of $\alpha$ and $\alpha'$ upon the sectors $S_2$ and $S_3$, respectively. The ultimate values of the angle $i$, the altitude A and the distance $\Omega \ V$ are then deduced by means of the abacuses.

$d$. A photographic proof is then taken of the reconstruction, and upon this proof is automatically inscribed the line $\Omega \ V$ image of the stretched wire F.

$e$. The point V is then placed upon the tracing having served for the reconstruction and then upon this tracing, applied upon the photographic reconstruction, is traced the radial vector $J_1 \ V$ carrying the correction $\gamma$, if the relief is known. It should be observed here that, if the first approximation has been sufficiently close, the guide points will be found exactly at their geographical positions.

$f$. If the relief is unknown. The tracings carrying the vectors such as $J_1 \ V$ are superposed and the positions $J_2$ are assumed (intersection of the vectors in planimetry); the corrections $\gamma$ are measured and the altitude $h$ deduced.

The operative method which has been described is in reality very rapid and practical. It is such that the reconstruction of a horizontal plate 18/24 taken at an altitude of 2,000 meters gives in two hours elements sufficient to construct on a scale of $\frac{1}{2000}$ a detail elevation of 60 hectares if the relief is known.

It is important to note at this point that the above described apparatus for photoreconstruction constitutes a universal apparatus.

In effect when an objective is employed for the reconstruction of which the focal distance is the same as that of the objective of the photographic apparatus of the flying machine, which say is φ, the general formulæ of the reconstruction are as follows:

Work cited, page 35, lines 28 and 29, and page 36, lines 2, 3 and 5, $$p = \varphi \frac{K + \cos i}{K}$$

$$p' = \varphi \frac{K + \cos i}{\cos i}$$

$$\cos \alpha = \frac{p^2 - \varphi^2}{2p\varphi} tg. i$$

$$\cos \alpha' = \frac{p^2 + \varphi^2}{2p\varphi} \sin i$$

$$tg. \mu = \frac{\sin i \cos i}{2K(K + \cos i) \sin \alpha}$$

with $K = \dfrac{AE}{\varphi}$

It is seen that if the value of K is constant, the distances $p$ and $p'$ are proportional to φ and that the angles α, α' and μ are independent of φ.

The abacus serving for the determination of the angle $i$ in terms of the angles α and α' is then utilizable without change.

If the scale E is given, it will suffice to modify the scales of the altitude A, of the distance Ω V and of the distance $p'$, in order that the abacuses serving for the determination of A, Ω V and μ may be utilizable without a new draught.

As an example of application, suppose 13/18 plates are taken at an altitude comprised between 2,000 and 3,500 meters with an objective of 26 centimeters and utilizing the same objective in the apparatus for reconstruction; the equation $$A = \frac{\varphi}{E} \cdot \frac{p' - \varphi}{\varphi} \cdot \cos i$$

becomes then for $$E = \frac{1}{5000} \text{ and } \varphi = 26 \text{ cm.}$$

$$A = 1{,}300 \left(\frac{2p'}{.52} - 1\right) \cos i$$

and the equation which gives Ω V becomes $$\Omega V = 1{,}300 \left(\frac{2p'}{0.52} - 1\right) \sin i$$

These are the same equations as the preceding ones but

A has been multiplied by 1.3 and $p'$ has been divided by 0.52.

A simple auxiliary graduation will permit then the employment of the same abacuses.

The use of the apparatus for the photographic reconstruction which is above described requires rapid calculation for the corrections of the relief as well as the determination as a function of the elements of measurement $p'$, α, α', of the angle of decentering μ, of the angle of inclination $i$, of the coefficient K, of the height A, and of the distance between the image of the center of the plate and the foot of the vertical line of the flying machine.

Calculating machines can be used for resolving these different problems provided that the apparatus records automatically the direction of the lines of the greatest inclination of the reconstruction and the position of the image of the centre of the plane; for this purpose the vertical thread F is kept stretched over the plate bearing frame and also as much as possible in the plane of the picture. Its image is obtained automatically on the photographic reproduction. The same constructions apply for the image of the center of the plate previously inscribed upon the original illustration. The apparatus above described has been constructed with a view of reconstruction at 1/2000 of the 18/24 plates taken between 1,500 and 2,500 meters of height with an apparatus of 50 centimeters focus.

The instrument thus obtained permits of obtaining industrially the transformation of views taken in the air into exact maps when the outline of the ground is known. It is applicable for topographic or hydrographic views up to a certain limit of precision which permits of cadastral plans (1/2000 to 1/5000).

Finally when the precaution has been taken of obtaining check photographs of the same territory, it enables the simultaneous determination of the planimetric and of the relief to be obtained, that is to say, finally the rapid and precise reduction of the complete maps to the scale above indicated.

Having now particularly described and ascertained the nature of the said invention and in what manner it is to be performed, I claim as my invention:—

1. A photographic reconstruction apparatus for correcting aerial photographs and for rapidly obtaining a perspective of ground photographed on a horizontal plane, as well as the geometrical elements necessary to transform such perspective view according to chart, said apparatus comprising, in combination, a projector; a plate-carrier mounted to permit the plate to rotate both in its own plane and about a horizontal axis passing through its center; an objective mounted to enable its decentration by causing its optical axis to rotate about a horizontal axis; bellows affording a light-tight connection, between the projector, the plate carrier and the objective; a projection frame adapted to rotate about both a horizontal and a vertical axis; a graduated scale; and supports movable along said scale and carrying, respectively. the plate-carrier, the objective and the projection frame.

2. In an apparatus of the type specified, the combination of a plate-carrier comprising an outer mounting, a disc adapted to turn therein and having a window disposed exactly central of it, and a grooved body encasing said mounting and adapted to turn about a horizontal axis passing through the center of the plate; a support for said carrier; a toothed sector mounted on said support; a pinion meshing with said sector to turn said grooved body; a scale carried by said support; and a pointer attached to said carrier for cooperation with said scale to indicate thereon the inclination of the carrier.

3. In an apparatus of the type specified, the combination of an objective; a support, a carrier for the objective mounted in the support; and means for swinging the principal axis of the objective about a horizontal axis passing through the middle of the nodal points so as to decentrate the objective, said decentering means comprising an adjusting screw, an operating button therefor, a graduated drum fixed to said screw to turn therewith, a pointer fixed to said support for cooperation with said drum; a straight edge fixed to said carrier and against one side of which the straight edge bears; and a spring-actuated plunger bearing against the other side of the straight edge.

In testimony whereof, I have signed my name to this specification in the presence of two subscribing witnesses.

HENRI ROUSSILHE.

Witnesses:
JULES FAYOLLET,
ANDRÉ BORDILLON.